United States Patent [19]

Hamano et al.

[11] Patent Number: 4,657,380

[45] Date of Patent: Apr. 14, 1987

[54] COPYING MACHINE

[75] Inventors: Hiroaki Hamano, Toyokawa; Kenji Shibazaki, Aichi, both of Japan

[73] Assignee: Minolta Camera Kabushiki Kaisha, Osaka, Japan

[21] Appl. No.: 839,780

[22] Filed: Mar. 13, 1986

Related U.S. Application Data

[63] Continuation of Ser. No. 726,797, Apr. 24, 1985, abandoned.

[30] Foreign Application Priority Data

Apr. 25, 1984 [JP] Japan .................................. 59-84780

[51] Int. Cl.4 ...................... G03G 15/04; G03G 21/00; G03B 27/52

[52] U.S. Cl. ...................................... 355/55; 355/3 R; 355/14 R

[58] Field of Search ................. 355/3 R, 11, 8, 55–57, 355/3 SH, 14 R

[56] References Cited

U.S. PATENT DOCUMENTS

| | | | |
|---|---|---|---|
| 3,445,161 | 5/1969 | Moss | 355/47 |
| 3,543,643 | 9/1985 | Shibazaki et al. | 355/55 X |
| 4,187,024 | 2/1980 | Satomi et al. | 355/14 R |
| 4,505,579 | 3/1985 | Furuichi | 355/55 |
| 4,533,233 | 8/1985 | Kimura et al. | 355/56 X |

FOREIGN PATENT DOCUMENTS

| | | |
|---|---|---|
| 55-28068 | 2/1980 | Japan . |
| 56-46267 | 4/1981 | Japan . |
| 58-208758 | 12/1983 | Japan . |

*Primary Examiner*—R. L. Moses

*Attorney, Agent, or Firm*—Price, Gess & Ubell

[57] ABSTRACT

A copying machine wherein a magnification ratio can be changed substantially continuously within a predetermined range, comprising means for setting a longitudinal magnification ratio of a copied image against an original and a lateral magnification ratio of a copied image against the original independently, image shifting means for shifting an image projected on a photosensitive drum in a direction away from a paper separation belt, first calculating means for calculating a lateral magnification factor, second calculating means for calculating a longitudinal magnification factor, and means for modifying the longitudinal and lateral copy magnification ratios respectively using the selected magnification ratio, the longitudinal and lateral magnification factors, whereby an image can be formed on the copy paper, preventing image drop out.

5 Claims, 30 Drawing Figures

COPYING MACHINE

This is a continuation of application Ser. No. 726,797, filed Apr. 24, 1985, now abandoned.

FIELD OF THE INVENTION

The present invention relates to a copying machine of an image transfer type, and more particularly to a control system thereof.

BACKGROUND OF THE INVENTION

In copying machines of image type transfer type, there has been proposed to provide a paper separating belt slidably contacted with one side of the surface of a photosensitive drum for assuring separation of a copying paper from the drum. Provision of paper separation device such as paper separation belt results in a loss of image 1*a* on a side edge portion of a copying paper 1 as shown in FIG. 1 with a width a corresponding to the width of the separation belt. In order to prevent the loss of image, as shown, for example, in Japanese Patent Application laid open under No. 28068/1980, there may be proposed to shift an image 2 in a direction away from the edge near the paper separating belt. However, shifting of the image introduces another loss of image 2*a* in the edge portion far from the paper separation device, therefore the above proposed approach is not a practical way to solve the above problem.

Besides the above problem, as shown, for example, in U.S. Pat. No. 4,187,024 in the copying machines of the above type, there is employed an arrangement for shifting a timing of paper feeding toward an image transfer portion relative to the timing during which an image formed on the photosensitive drum reaches the image transfer portion so as to provide a binding margin in either the leading edge portion or trailing edge portion of each copied paper. An image loss 1*b* also happens in either the leading edge portion or trailing edge portion as shown in FIG. 2 in the above arrangement for providing the binding margin.

In order to eliminate the image loss 1*a* or 1*b*, it is necessary to adjust copying magnification and particularly in a case where the width of the binding margin is adjustable, it is desired to make the copying magnification adjustable both manually and continuously as shown in Japanese Patent Application laid open under No. 208758/1983 U.S. Pat. No. 4,543,643. However, it may be troublesome to adjust the magnification manually corresponding to the binding margin which is set by the operator as desired so as to form the image on the copying machine as wide as possible over an available area of the copying paper.

On the other hand, as shown, for examples, in U.S. Pat. No. 3,445,161 of Japanese Patent Application laid open under No. 46267/1981, there is proposed an anamorphic magnification copy which is able to vary the magnification in a longitudinal direction and the magnification in a lateral direction. The anamorphic magnification is used for either varying the longitudinal vs lateral ratio of a figure in view of design or eliminating the image loss. Therefore, the anamorphic magnification is effective to make a copy as wide as possible over the available area of the copying paper without image loss.

However, even when anamorphic magnification is used, with the manual setting of the magnification, there still remains the problem of troublesome operation in setting the correct magnification.

SUMMARY OF THE INVENTION

An essential object of the present invention is to provide a copying machine in which the copying magnification can be calculated and set automatically corresponding to the size of the binding margin with a simple operation without causing an image loss.

According to the present invention, there is provided a copying machine wherein a magnification ratio can be changed substantially continuously within a predetermined range, comprising means for setting a longitudinal magnification ratio of a copied image against an original and a lateral magnification ratio of a copied image against the original independently;

first operation means for indicating to effect a copy with the longitudinal magnification ratio different from the lateral magnification ratio;

paper separation means for separating a copied paper from a photosensitive drum, said paper separation means being provided with a separation belt which contacts on the side edge of the photosensitive drum;

image shifting means for shifting an image projected on the photosensitive drum in a direction away from the separation belt;

second operation means for indicating to effect the image shifting operation by the image shifting means;

means for forming a margin on any one of a leading edge portion or trailing edge portion of a copy paper;

third operation means for indicating to effect to form the margin on the copy paper;

means for detecting the size of the copy paper;

first calculating means for calculating a lateral magnification factor (A-a)/A upon operation of the second operation means, wherein A is a lateral size of the copy paper obtained from the detecting means and a is an amount of image shift;

second calculating means for calculating a longitudinal magnification factor (B-b)/B upon operation of the third operation, wherein B is a longitudinal size of the copy paper obtained from the detecting means and b is an amount of image shift;

means for setting the lateral magnification factor and the longitudinal magnification ratio to 1 respectively when the second operation means and the third operation means are not operated; and means for modifying the copy magnification ratios respectively by calculating lateral and longitudinal magnification ratios by using the selected magnification ratio, the longitudinal magnification factor and lateral magnification factor when said first operation means is operated.

BRIEF DESCRIPTION OF THE DRAWINGS

FIG. 13 is a block diagram showing a control device of the copying machine shown in FIG. 5, and FIGS. 14 through 22 are respectively flow charts showing operation of the copying machine according to the present invention, wherein

DETAILED DESCRIPTION OF A PREFERRED EMBODIMENT

General Construction of a Copying Machine

Figure 5:
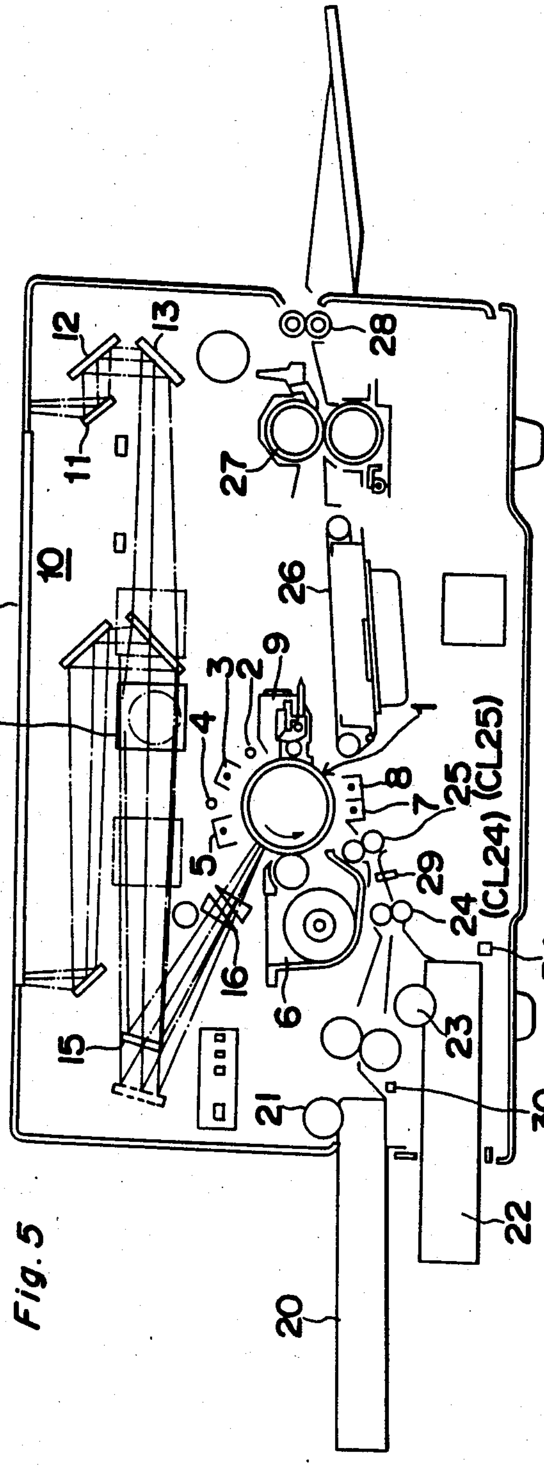
FIG. 5 is a schematic diagram showing a general view of an inside of a copying machine.
Figure 6:
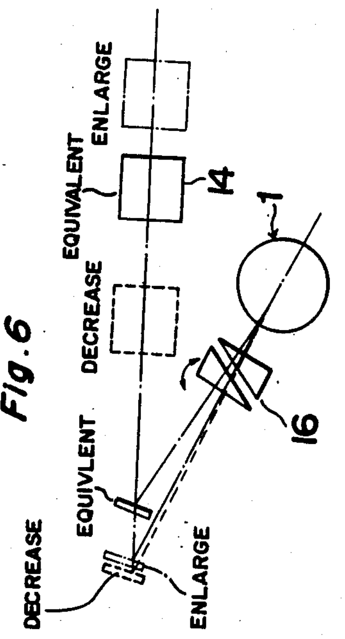
FIG. 6 is a schematic diagram showing a general concept of an optical system used in the copying machine shown in FIG. 5.

Referring to FIG. 5, a photo-sensitive drum 1 is provided in the central part of a copying machine so as to rotate in a counter clockwise direction. There are disposed about the drum 1, a main eraser lamp 2, a sub charger 3, a sub eraser lamp 4, a main charger 5, a developing device 6 of a magnetic brush type, a transfer charger 7, a separating charger 8 for separating a copying paper from the photo-sensitive drum 1 and a cleaning device 9 of a blade type around the photo-sensitive drum 1. The photo-sensitive drum 1 has its cylindrical surface coated with photo-sensitive material and the cylindrical surface of the photo-sensitive drum 1 is charged with a possible electro static charge by the chargers 3 and 5 during rotation of the drum 1. The photo-sensitive drum is adapted to be exposed to an image of an original to be copied through an optical system 10.

The optical system 10 is movably disposed under the transparent glass 17 for scanning the original put on the glass 16 and is composed of light source (not shown), movable mirrors 11, 12 and 13, a lens 14 and a mirror 15. Said light source and the movable mirror 11 are mounted on a slider (not shown) and adapted to move leftward at a speed of V/n (wherein V is rotation speed of the photo-sensitive drum 1 and n is a ratio of magnification) and movable mirrors 12 and 13 are mounted on another slider (not shown) and moved leftward at a speed of V/2n by a DC motor M3. When the copying magnification is to be changed, said lens 14 is moved along the optical axis of the lens and the mirror 15 is moved. In changing the longitudinal and lateral ratio, the prism 16 is also rotated for correcting a distortion of the image. In addition, the position of the lens 14 can be changed depending on whether or not the image on the drum is shifted by the size of a paper separation belt, for this purpose, there is provided an image shifting unit. The details of the magnification control will be described hereinafter.

In the left half portion of the copying machine, there are provided paper feeding units 20 and 22 each having paper feeding rollers 21 and 23. A paper feeding path is formed by a pair of rollers 24 and 25, a transfer belt 26, a fixing device 27 and a pair of paper discharging rollers 28. A copying paper sensing switch 29 is provided between the pair of rollers 24 and 25 with clutches (CL24) and (CL25) which are turned on and off in predetermined timings which will be described hereinafter.

Figure 7:
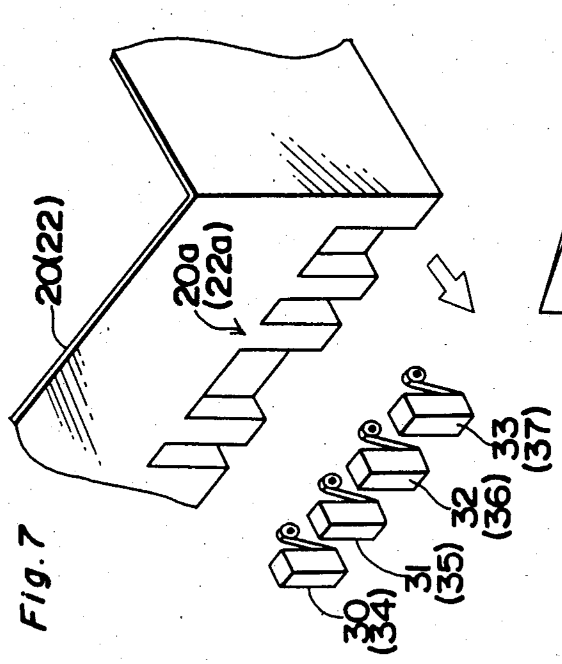
FIG. 7 is a perspective view showing an arrangement for detecting the size of copy papers employed in the copying machine shown in FIG. 5.

In the copying machine shown in the embodiment, there is provided a paper size sensing device for sensing the size of copying papers set in the copying machine. Referring to FIG. 7, coded patterns 20*a* and 22*a* are formed with projections and switches 30 through 31, 34 through 37 are provided on a portion of the body of the copying machine so that when one of the paper feeding cassettes 20 or 22 is set in the copying machine the switches can be opposed to the coded patterns 20*a* and 22*a* for being made on or off. A plurality of paper feeding cassettes are prepared for each paper size exclusively with the coded patterns 20*a* or 22*a*. By this arrangement, the combination of the on states and the off states of the respective switches 30 through 33, 34 through 37 identifies the size of the copying papers set in the paper feeding cassettes 20 and 22.

Image Shifting Device

Figure 1:
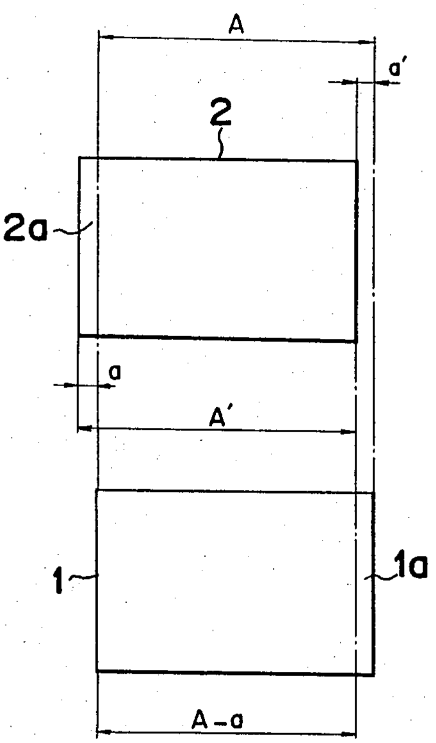
FIGS. 1 and 2 are schematic diagrams showing displacement between an image of an original and an image of a copy.
Figure 2:
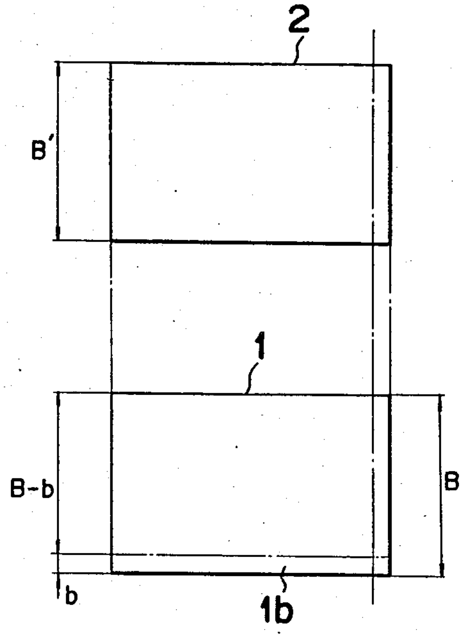

The image shifting device is provided in the embodiment of the copying machine containing the paper separation belt for separating compulsorily the copying papers from the photosensitive drum so as to shift the image 2 in FIG. 1 by the distance a of the image loss 2*a* in a leftward direction in FIG. 1. The separation belt is provided so as to contact on the side edge of the photosensitive drum 1.

Figure 8:
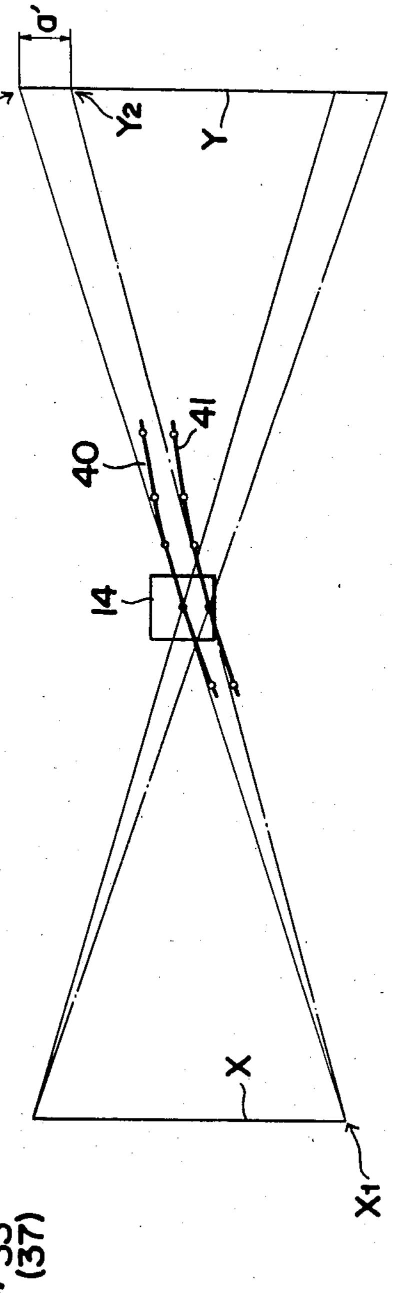
FIG. 8 is a schematic diagram showing a way of shifting an image.

As shown in FIG. 8, in a case where the shifting of the image is unnecessary (this case is referred to as non-image shifting), the lens 14 is moved and positioned along a first standard locus 40 in FIG. 8 corresponding to the longitudinal magnification ratio so that a standard end X1 of the surface X of an original to be copied can be positioned at a first standard position Y1 of the surface of the photosensitive drum 1. In a case where shifting of the image 2 is necessary (this case is referred to as image shifting), the lens 14 is moved and positioned along a second standard locus 41 corresponding to the longitudinal magnification ratio so that the standard end X1 is positioned on a second standard end Y2.

Figure 9:
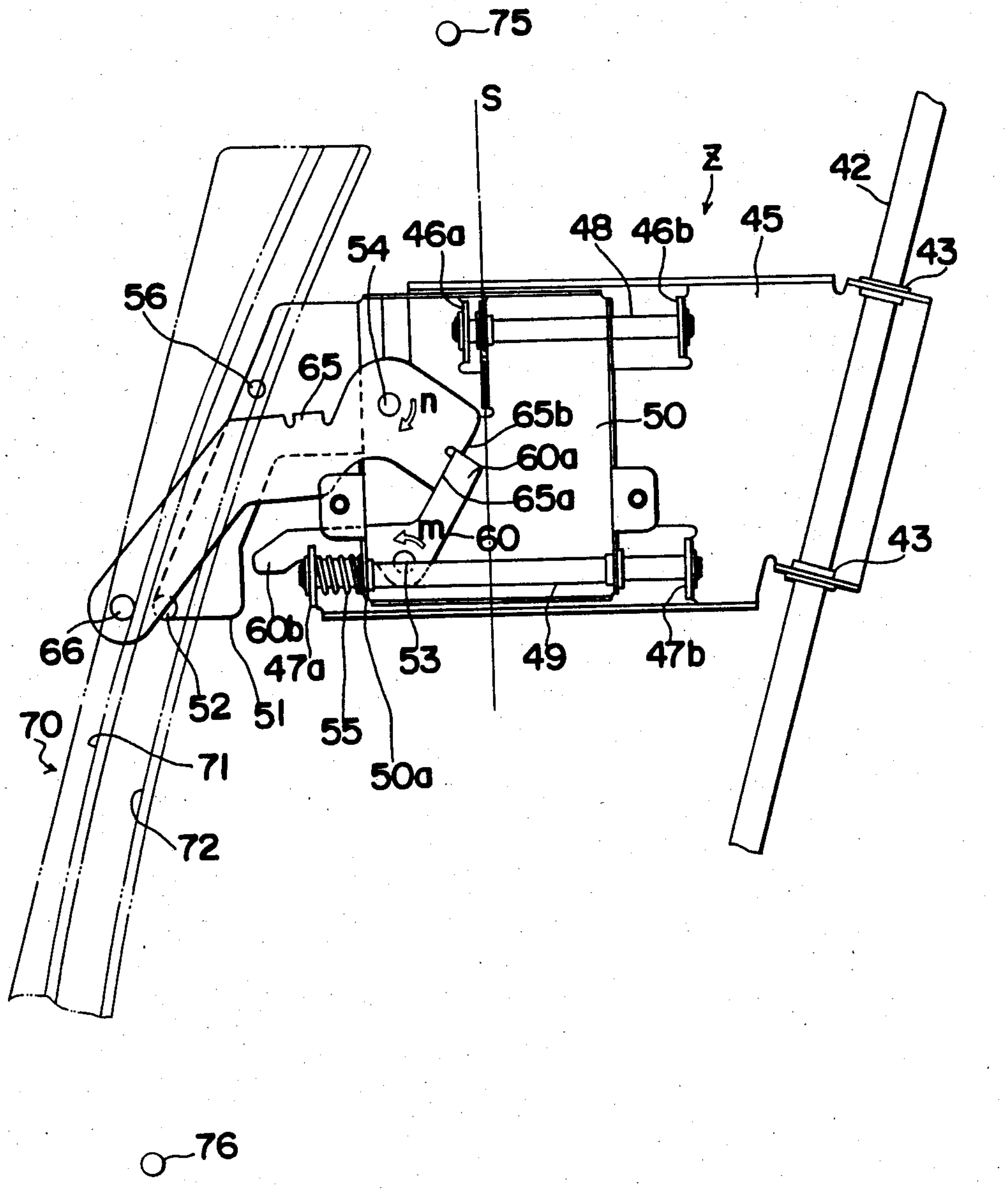
FIG. 9 is a plan view showing an arrangement for shifting the image.

The image shifting mechanism Z is shown in FIG. 9. Referring to FIG. 9, a supporting shaft 42 and a cam assembly 70 are respectively fixed on the body of the copying machine with an angle with respect to the light axis S. Said cam assembly 70 includes a first standard surface 71 for the non-image shifting and a second standard surface 72 for the image shifting. Change-over pins 75 and 76 are fixed on the body of the copying machine near the both end portion of the cam assembly 70.

A longitudinal movement holder 45 is slidably mounted on the supporting shaft 42 and is driven by a motor (not shown) along the supporting shaft 42. A lateral movement holder 50 is slidably mounted on a pair of shafts 48 and 49 one shaft 48 is supported by support members 46*a* and 46*b* raised from the longitudinal movement holder 45 and another shaft 49 is supported by support members 47*a* and 47*b* raised from the holder 45. The lateral movement holder 50 is exerted in the right direction in FIG. 9 by means of a coil spring 55 fitted around the shaft 49 between the support member 47*a* and a wall 50*a* of the lateral movement holder 50.

The horizontal movement holder 50 has its left portion extended laterally to form an operation arm 51 on which a cam follower 52 is projected so as to slidably follow the surface of the second standard cam 72. The lens 14 is fixed on the horizontal movement holder 50.

A lock lever 60 and a first standard lever 65 are rotatably supported on the lateral movement holder 50 by supporting pins 53 and 54 each standing on the lateral movement holder 50 respectively, both of the levers 60 and 65 being respectively exerted in directions (m) and (n) by resilient members (not shown). One end portion 60*a* of the lock lever 60 is adapted to be detachably engaged with a cut portion 65*a* recessedly formed at one end portion of the first standard lever 65 for stopping rotation of the levers 60 and 65. The first standard lever 65 is engageable with a stopper pin 56 for stopping rotation. Said one end portion 65*a* of the first standard lever 65 is provided with a cam follower 66 which is slidably engaged with the first standard cam surface 71.

Figure 10:
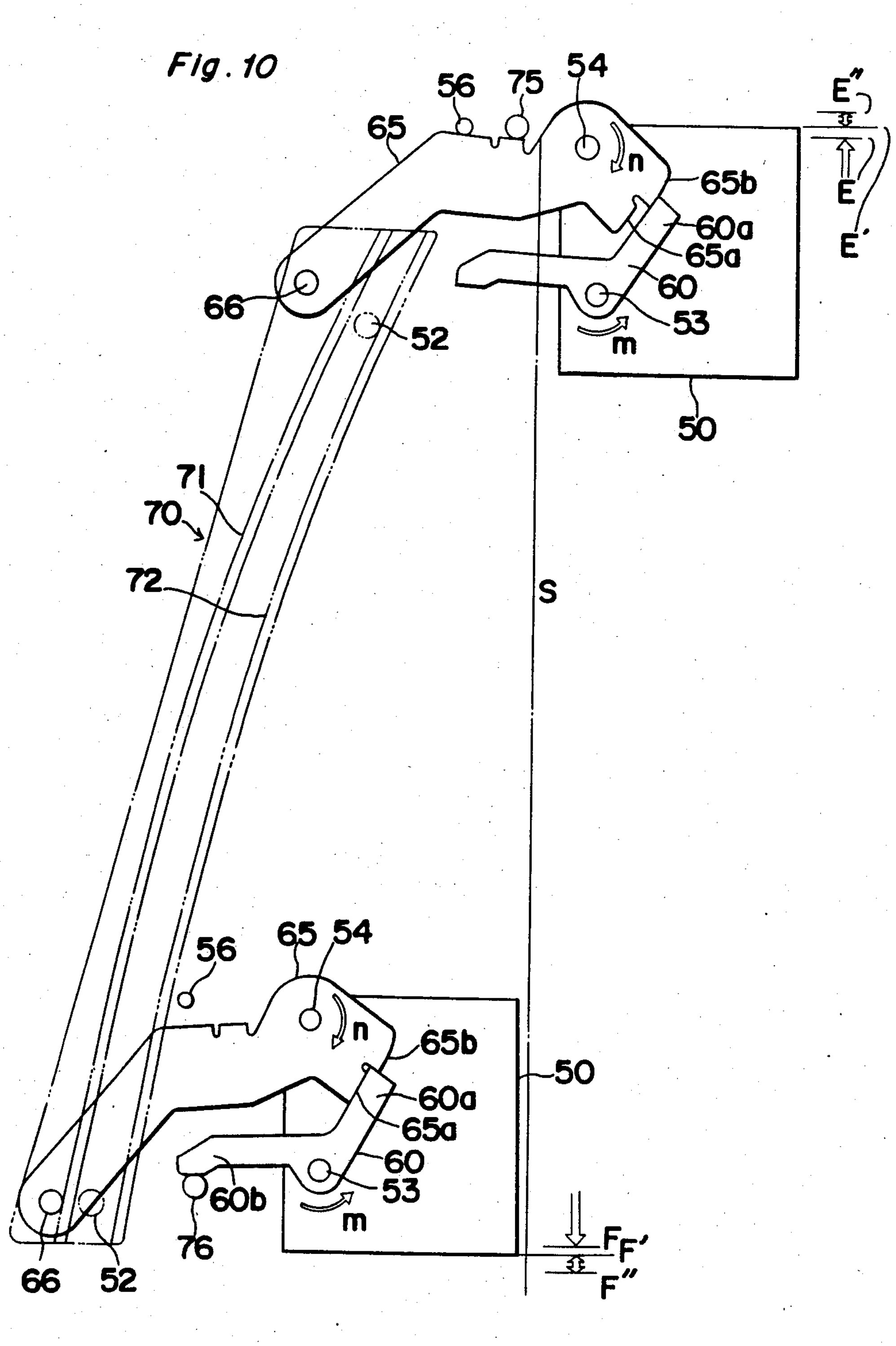
FIGS. 10 and 11 are schematic diagrams showing the operation of the arrangement shown in FIG. 9.
Figure 11:
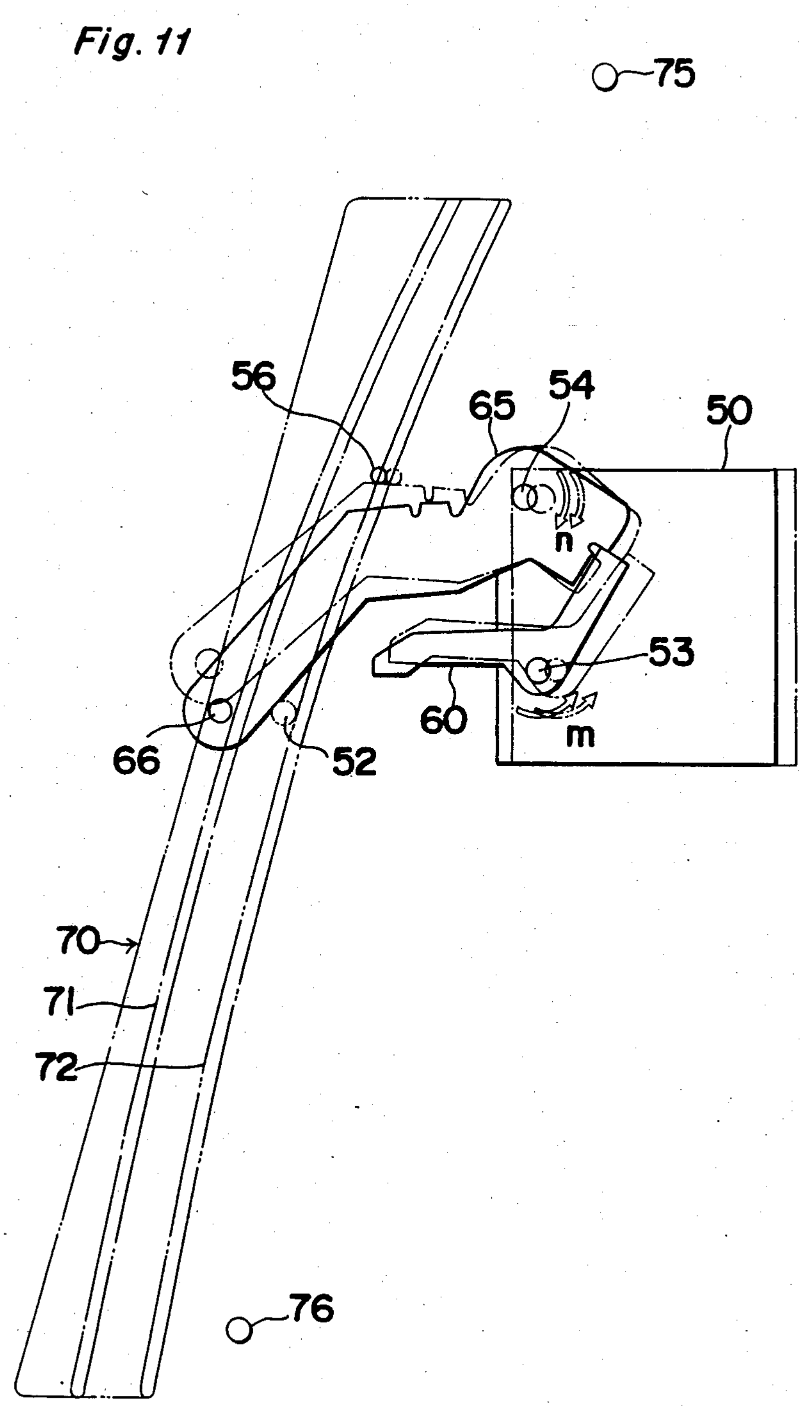

In the arrangement described above, in case of not shifting the image, the cam follower 66 of the first standard lever 65 can be slided guided along the first standard cam surface 71 as shown in FIG. 11. To the contrary, in case of shifting the image, the cam follower 52 of the lateral movement holder 50 is slided along the second standard cam surface 72 as shown in the phantom line in FIG. 11, whereby a position of the lateral movement holder 50 with respect to a direction vertical to the light axis S can be decided so as to control the position of the lens 14. It is noted that when the magnification ratio is changed, the lens 14 can be moved between (E) and (F) (FIG. 10) by the movement of the longitudinal movement holder 45 corresponding to the longitudinal magnification ratio, however when shifting the image, the lens 14 is moved between (E') and (E'') or (F') or (F'') which are out of range for changing the magnification ratio.

The lower half of FIG. 10 shows the state of the arrangement described above, just before the image shifting from the non shifted position to the shifted position wherein the lens 14 is situated in the non sifted position with the cam follower 66 engaged with the first standard face surface 71. Then the image shifting mechanism z is moved downward in FIG. 10, so that the lock lever 60 can be rotated in the direction opposite to the direction m by engagement of another end 60*b* of the lock lever 60, and in turn the first standard lever 65 is released from the engagement with said one end 60*a* of the lock lever 60, thereby being rotated in the direction indicated by the arrow mark (n) up to such a position where the first standard lever 65 is engaged with the stopper pin 56. Then the cam follower 66 is moved away from the first standard cam surface 71 and the cam follower 52 is engaged with the second standard cam surface 72, whereby the lens 14 is moved to the shifted position with the lateral movement holder 50. Said one end 60*a* of the lock lever 60 is placed on the end face 65*b* of the first standard lever 65.

The upper half of FIG. 10 shows the state of the image shifting mechanism just before changing from the shifted position to the non shifted position. The first standard lever 65 is engaged with the change over pin 75 by the movement of the mechanism upward, being rotated in the direction opposite to the direction (n). The cam follower 52 is moved away from the second standard cam surface 72 and the cam follower 66 is engaged with the first standard cam surface 71, whereby the lens 14 is moved toward the non shifted position with the lateral movement holder 50. The end 60*a* of the lock lever 60 is engaged with the cut portion 65*a* of the first standard lever 65 so as to stop rotation of the first standard lever 65 when the lever 65 is disengaged from the stopper pin 75.

Control Device

Figure 12:
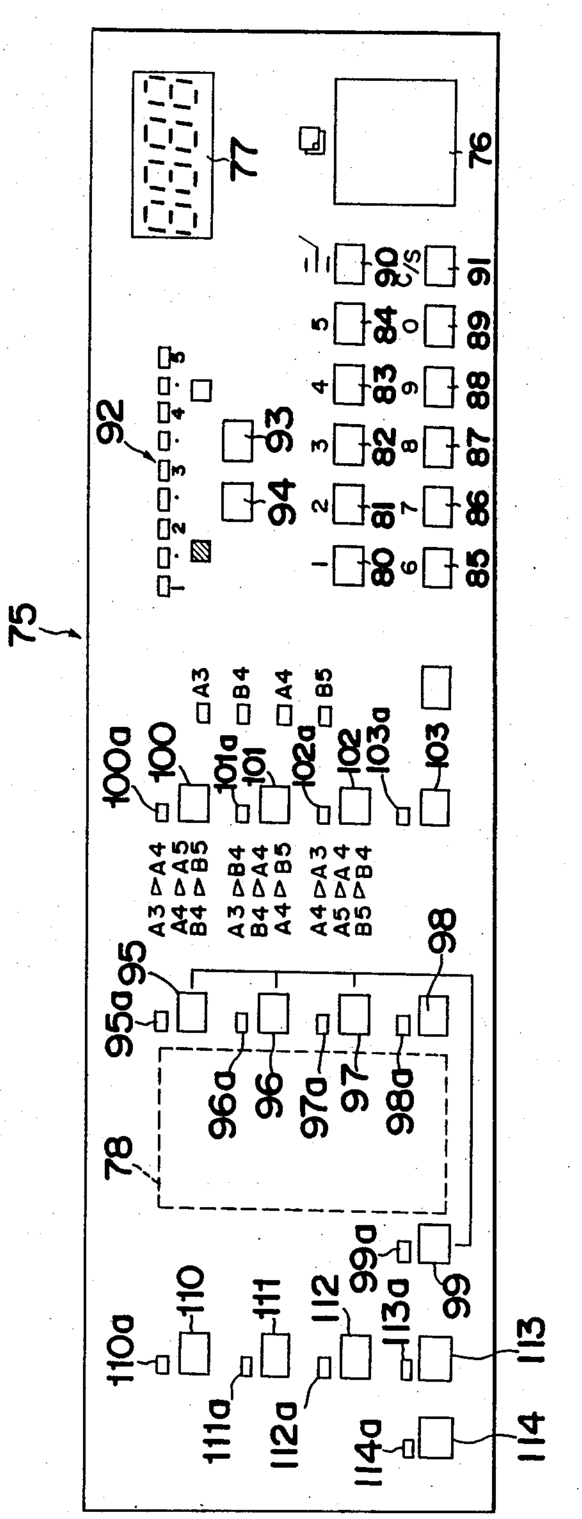
FIG. 12 is a top plan view of an operation panel used in the copying machine shown in FIG. 5

An operation panel 75 is shown in FIG. 12. A print key 76 is for starting a copy. A display unit 77 serves to display the number of copy, magnification ratio, shift amount and trouble code in digital form.

Ten keys (numerical keys) 80 through 89 are provided for entering numeric value 1 to 9 and 0, the value entered may be displayed on the display unit 77.

An interruption key 90 is provided for effecting a copy interruption during other copy operation.

A clear/stop key 91 is provided for clearing off the data entered from the ten keys 80 through 89 or stopping a continued copying operation.

Copy density setting keys 93 and 94 are provided for setting a desired copying density or darkness of the picture and the key 93 is for decreasing the copy density and the key 94 for increasing the density. A light emitting diode (referred to as LED hereinafter) 92 displays the signal from any one of the keys 93 and 94.

Magnification set keys 95 through 98 are provided for preliminarily setting a desired magnification ratio. Operation of any one of the keys 95 through 98 can be displayed on any one of LEDs 95*a* through 98*a*.

A preset selection key 99 acts to enable the magnification set keys 95 through 98 for setting the desired magnification ratio upon a first time operation thereof, while the second time operation thereof disables said magnification setting.

Keys 100 through 103 are provided for setting any one of the fixed magnification ratios listed on the left side of the panel and operation of any one of the keys 100 through 103 is displayed by illumination of any one of the LEDs 100*a* through 103*a*.

A shift selecting key 110 is provided for selecting whether or not to shift the image, and initialized state of the key 110 indicates non shifting operation and the first operation of the shift selecting key 110 enables the shifting operation. Further subsequent operation of the key causes the shifting operation to be disabled. When the shifting operation is enabled LED 110*a* is illuminated.

A variable magnification selection key 111 is provided for modifying a magnification ratio of the longitudinal direction (referred to as longitudinal magnification hereinafter) and a magnification ratio of the lateral direction (referred to as lateral magnification hereinafter) independently. With an initial state of the key 111, the modification is disabled. With a first operation of the key 111, the modification of both of the longitudinal magnification and the lateral magnification is enabled with the LED 111*a* illuminated and with either the initialized state or the second operation of the key 111 the modification of the magnification is disabled with the LED 111*a* turned off.

A binding margin set key 112 is provided for enabling to set the binding margin of the copied paper. In the preferred embodiment, the binding margin can be set by 1 through 20 mm as desired. At the initial state of the key 112, the setting of the binding margin is disabled. A first operation of the key 112 enables to set the binding margin. The subsequent operation or the second operation disables the setting of the binding margin. When the setting of the binding margin is enabled, LED 112*a* is illuminated and the desired binding margin can be set by operation of the ten keys 80 through 89.

Keys 113 and 114 are provided for selecting which side of the leading edge or trailing edge of the copying paper the binding margin is formed. Key 113 is for selecting the leading edge and key 114 is for selecting the trailing edge. Therefore, the key 113 is referred to as leading section key and the key 114 is referred to as trailing selection key. Selection of the leading edge and trailing edge is enabled upon a first time operation of both keys and disabled upon a second time operation. When the selection is enabled LED 113*a* or 114*a* is illuminated.

Figure 13:
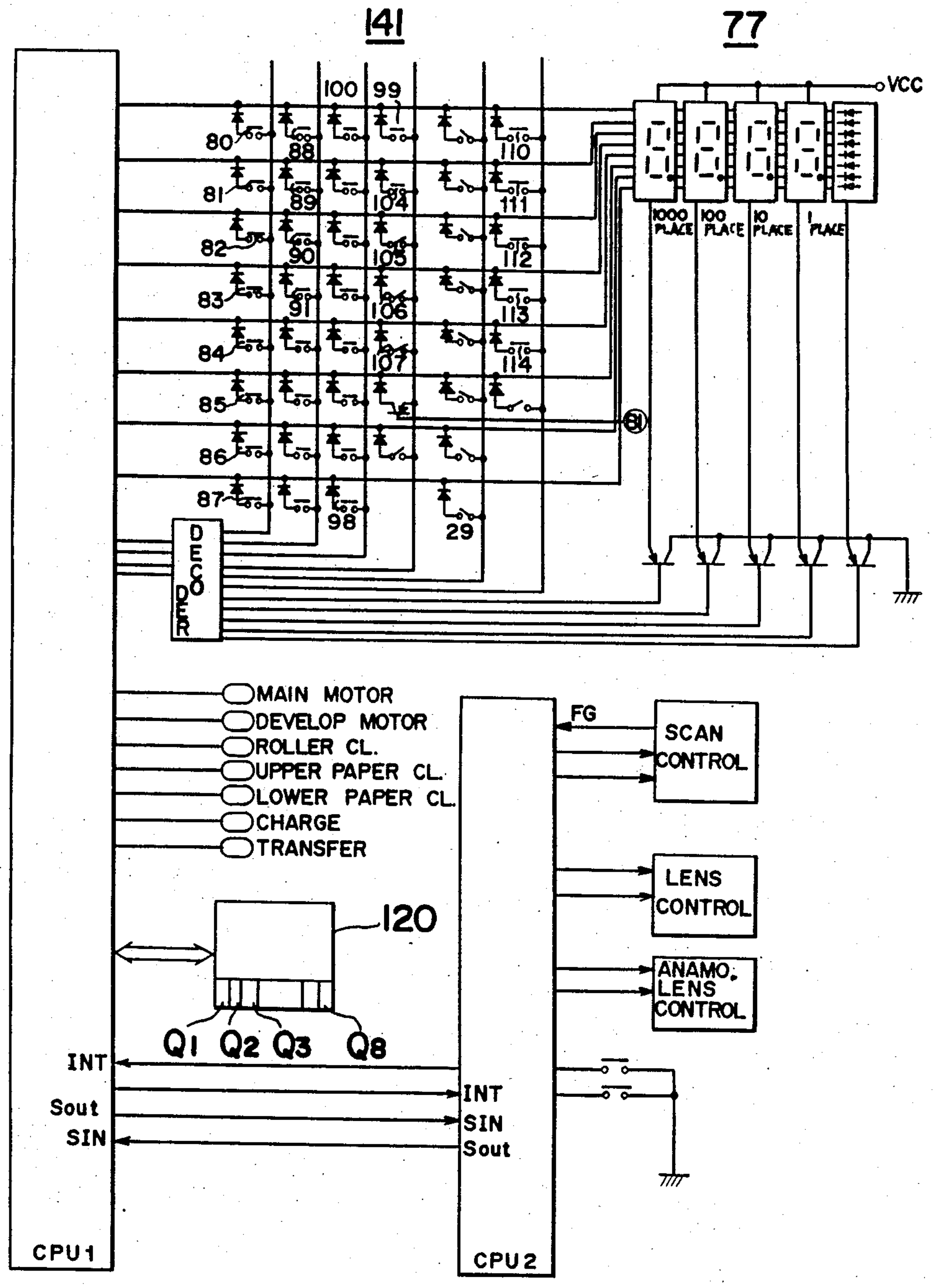

Control circuit arrangement is explained with reference to FIG. 13.

A first control unit CPU using a micro computor serves to control the copying machine and the operation panel.

A second control unit CPU2 using a micro computor serves to control a speed of a scan motor and to control position of the lens 14 and a prism based on the signal fed from the control unit CPU1.

A RAM (random access memory) 120 stores various data and programs for controlling the copying machine including the data of magnification ratio and the data for shifting the image.

A key matrix 141 contains the respective keys 80 through 91 on the operation panel 75 and the switch 29 and other sensing switches provided inside the copying machine.

Control of the longitudinal magnification and the lateral magnification is hereinafter explained. This magnification control is made automatically and independently of the longitudinal and lateral directions corresponding to the image drop out portion (a) due to the shift of the image and the image drop out portion (b) due to the binding margin. In operation, first the lateral magnification factor (A-a)/A is calculated for the width A of the copying paper 1, then multiplied with (n) of the set copying magnification so as to calculate the lateral magnification n(A-a)/A. While the longitudinal magnification factor (B-b)/B is calculated for the length of the copying paper 1, the multiplied with (n) of the set copying magnification so as to calculate the longitudinal magnification n(B-b)/B. Then the position and rotational angle of the lens 14 and prism 16 are controlled according to the calculated lateral and longitudinal magnifications.

Figure 3A:
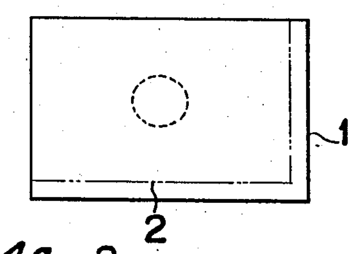
FIGS. 3*a*, 3*b*, 4*a* and 4*b* are schematic diagrams showing various features of copies.
Figure 3B:
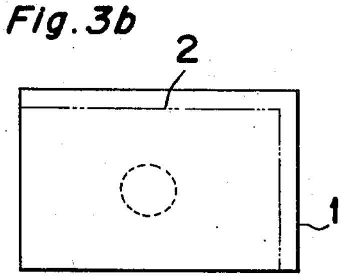
Figure 4A:
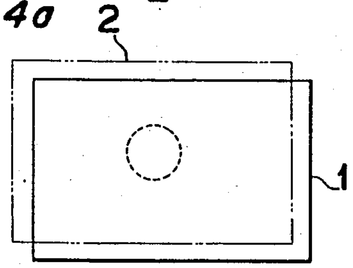
Figure 4B:
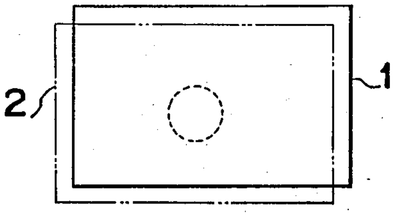

Copy Operation (1) After operation of the shift selecting key 110, magnification selecting key 111 and binding margin set key 112, a desired binding margin is entered in the control unit CPU1 upon operation of any of the ten keys, subsequently the leading selection key 113 or trailing selection key 114 is operated. By these operations, the longitudinal magnification and the lateral magnification are calculated and an original is copied by the copying machine, so that the image is copied on the copying paper 1 in the area surrounded by the phantom line with the binding margin 1*b* defined in the trailing portion (FIG. 3*a*) or the binding margin 1*b* defined in the leading portion defined (FIG. 3*b*).

In a case where the longitudinal magnification differs from the lateral magnification, if a picture of a circle is copied, there is copied an oval shape.

(2) In a case where after operation of the shift selecting key 110 and the binding margin setting key 112, a desired binding margin is entered by ten keys and any one of the leading selection key 113 or trailing selection key 114 is operated, a circle can be copied into a circle as shown in dotted line, there may occur a loss of the image as shown in the double chain line.

(3) A normal copy can be made without operation of the various keys 110 through 114.

(4) After operation of the magnification selecting key 111, a desired longitudinal magnification and a desired lateral magnification can be independently entered by ten keys 80 through 89, so as to make only an anamorphic magnification copy.

Control Operation by the Control Unit

A control procedure in the control unit CPU1 will be explained with reference to FIG. 14.

Figure 14:
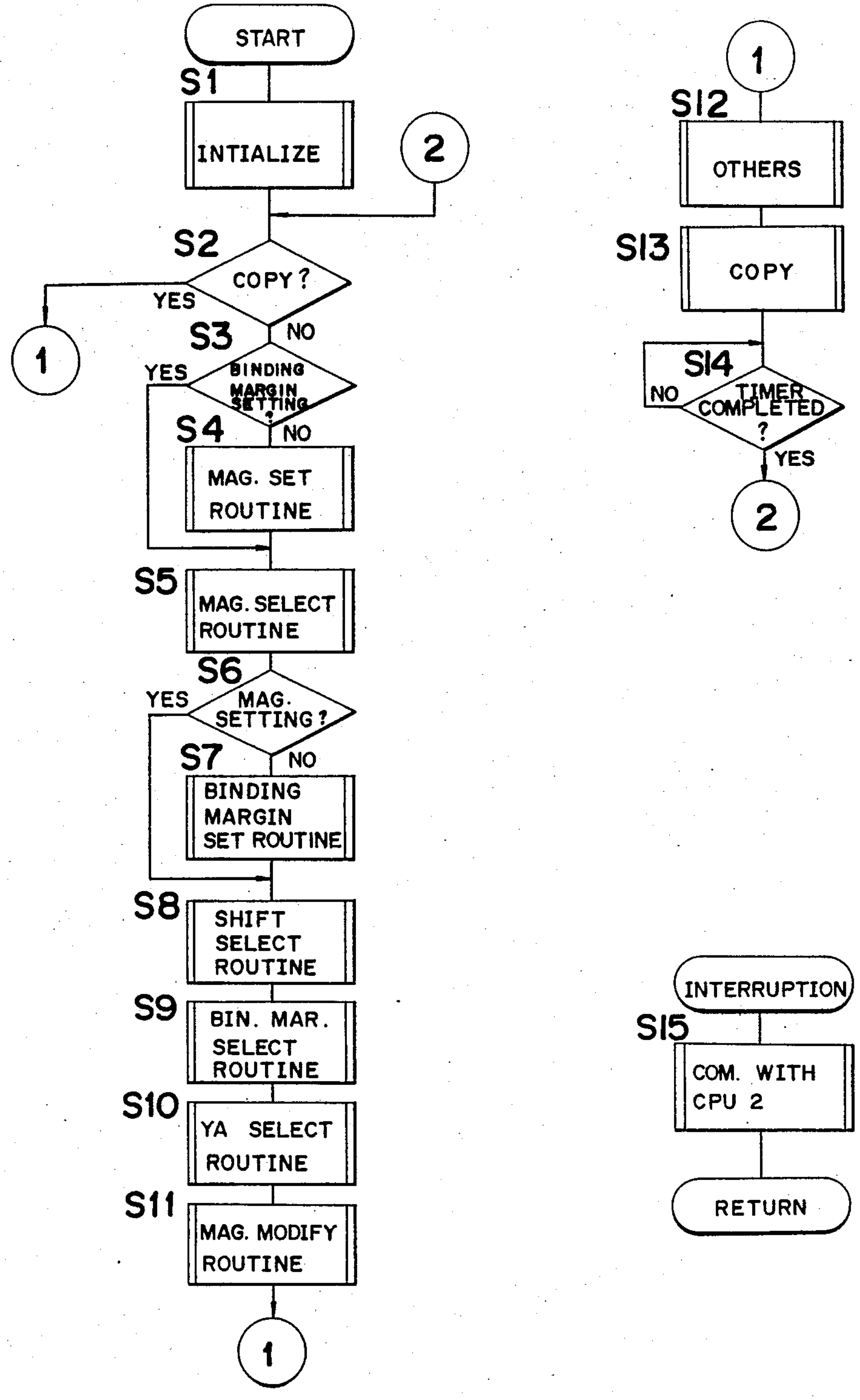

Referring to FIG. 14 showing a general main flow of the control program wherein in the step S1, the CPU1 is initialized and in the step S2 it is judged whether a copy routine is being executed. If the copy routine is executed, the program flow goes to the step S12. If the copy routine is not executed, it is judged in the step S3 whether the binding margin set routine is executed. If the binding margin set routine is not executed, the program flow goes to the step S4 for execution of a magnification set routine. If the binding margin set routine is executed, the program flow goes to the step S5 for execution of a magnification selecting routine wherein a selected magnification ratio designated by any one of the keys 95 through 98 and 100 through 103 is written in RAM 140.

Subsequently, it is judged in the step S6 whether a magnification ratio set routine is executed, if not, the program flow goes to the step S7 to execute a binding margin set routine. If the magnification ratio routine is executed, the program flow goes to the step S8 for execution of a shift selection routine to decide to shift the image or not to shift it.

Subsequently, in the step S9, a binding margin set routine is executed for setting whether or not to form the binding margin and in turn in the step S10, a magnification selection routine is executed for setting whether or not to vary the longitudinal magnification and the lateral magnification. Thereafter, a magnification modifying routine is executed in the step S11 for modifying the set magnification corresponding to the image shift and the size of the binding margin.

Furthermore, other processes such as a temperature control of the fixing device 27 and so on is executed in the step S12, then a process of copy is executed in the step S13 then waits for lapse of time set by an internal timer in the microcomputer of control unit CPU1, thereafter the program flow goes back to the step S2.

The interrupt routine serves either to communicate with the control unit CPU2 in the step S15 and to control the scanning of the optical system 10 and so on.

Figure 15:
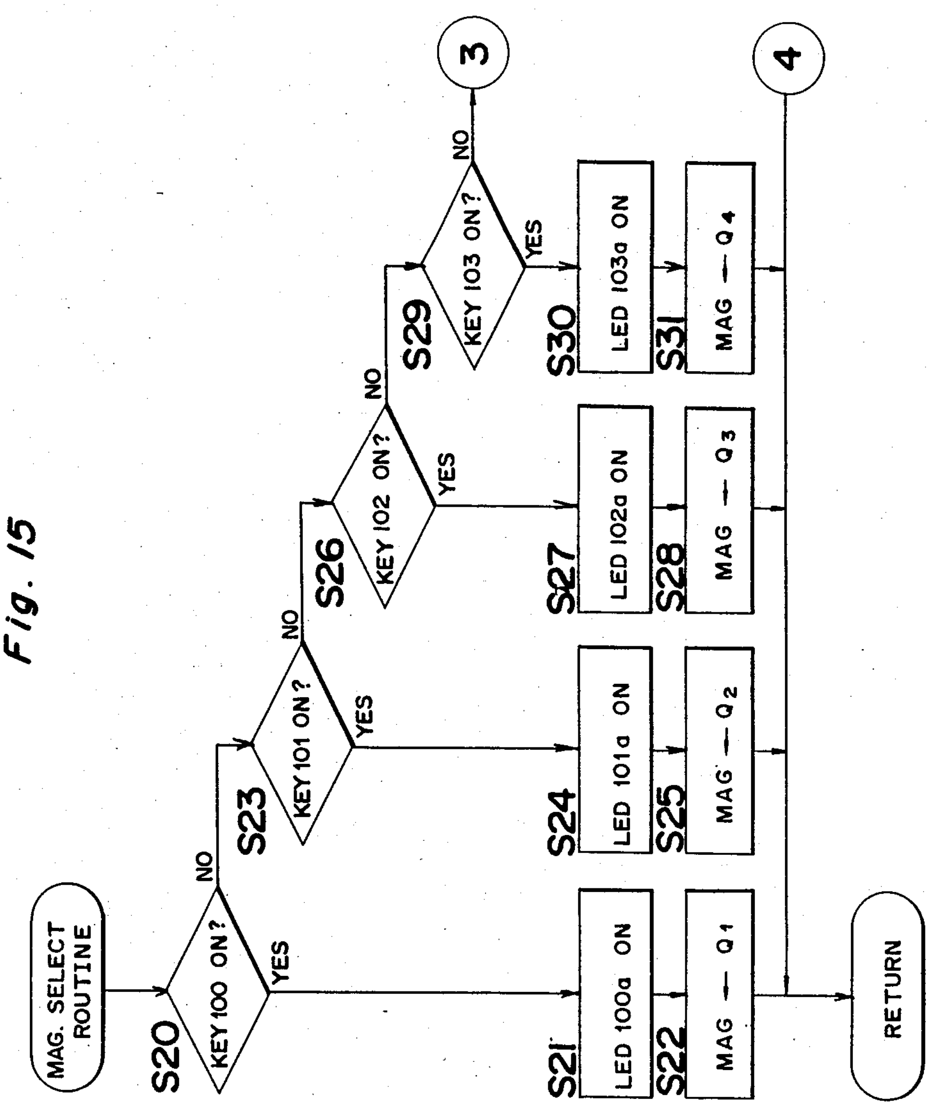
Figure 16:
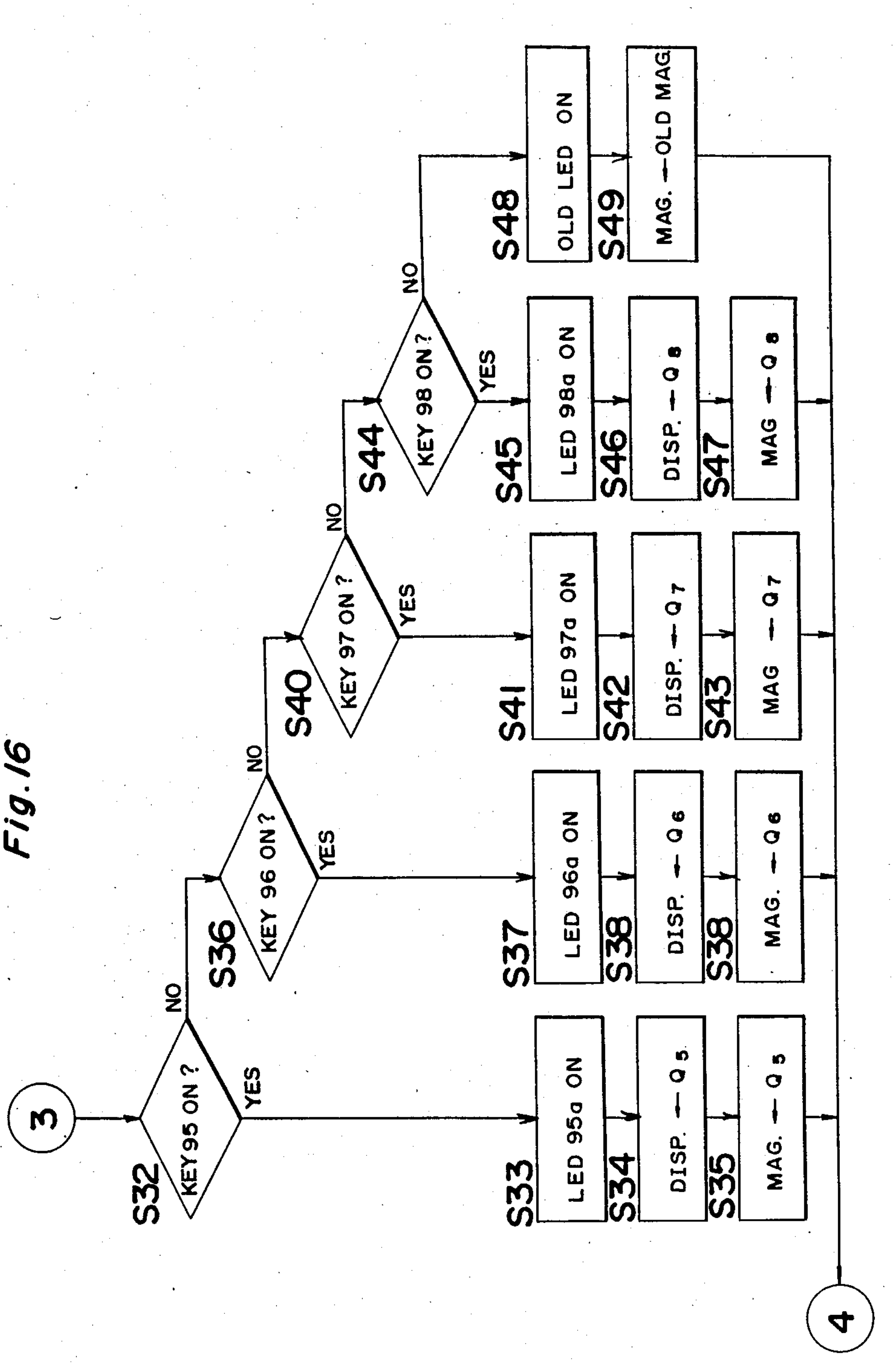

The magnification ratio set routine indicated by S5 in FIG. 14 is shown in FIGS. 15 and 16. This routine serves to set the magnification ratio selected by operation of any one of the magnification set key 95 through 98 and 100 through 103 in the RAM 120.

In the steps S20, S23, S26, S29, S32, S36, S40 and S44, it is judged what key among the magnification set keys 95 through 98 and 100 through 103 is pressed. Assuming that the magnification key 101 is pressed (this is judged in the step S23), LED 101*a* is turned on in the step S24 and the magnification ratio Q2 is stored in the RAM.

If none of the magnification set keys is depressed, an old magnification ratio already set in the most recent past is set in the RAM and LED corresponding to the old magnification ratio is turned on in the step S49.

Figure 17A:
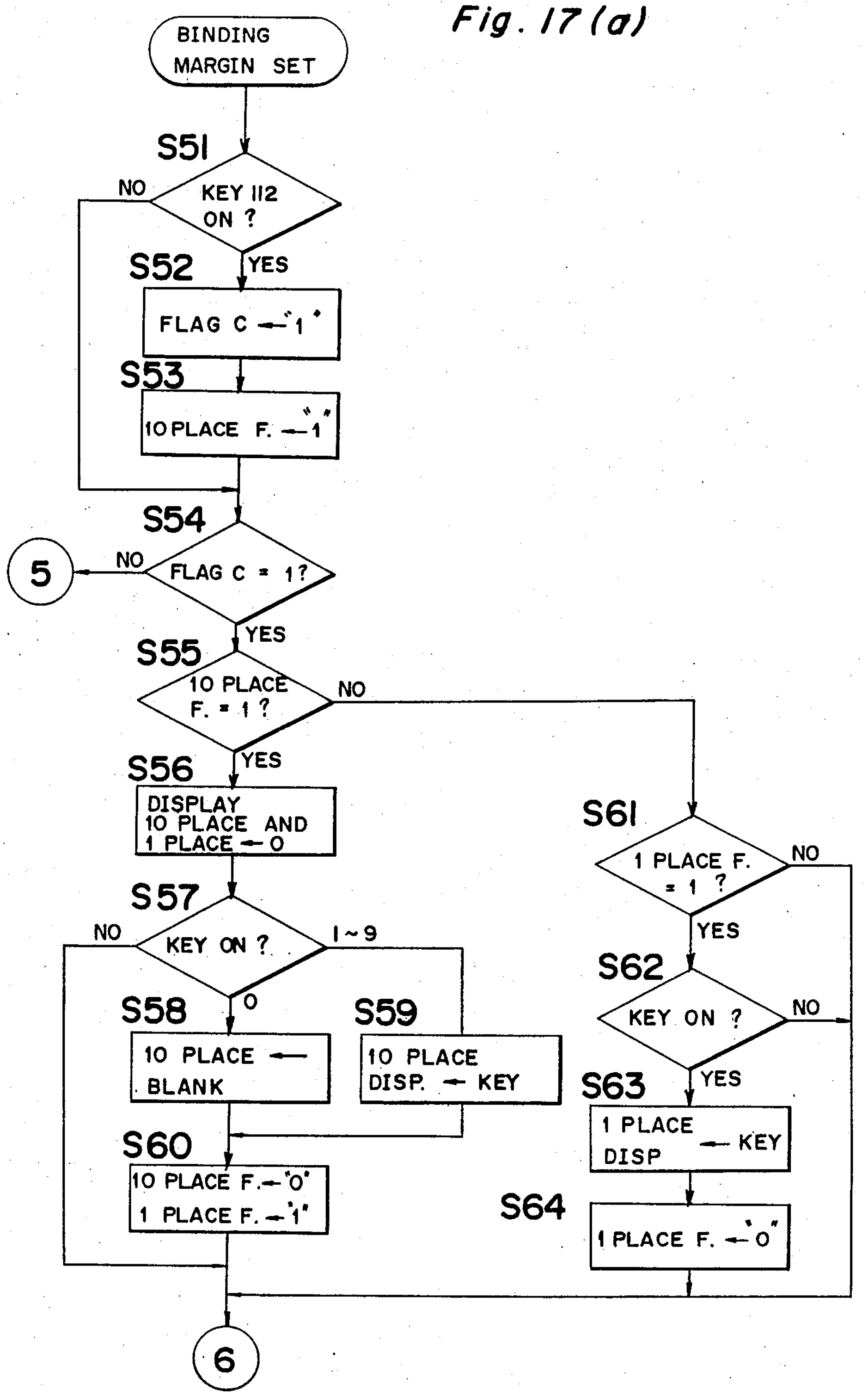
FIG. 17 is comprised of FIGS. 17(*a*) and 17(*b*)
Figure 17B:
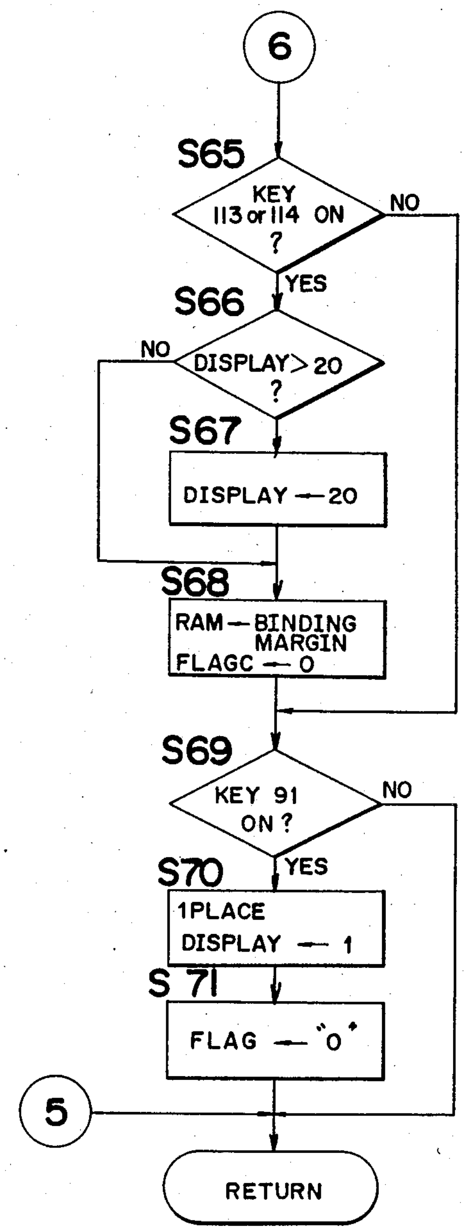

FIG. 17 shows the binding margin set routine S7.

In the step S5, it is judged in the step S51 whether the binding margin set key 112 is depressed, a flag C is set to "1" in the step S52, setting a flag representing the place of 10 (referred to as 10 place flag hereinafter) to "1". "1" of the flag C represents that the magnification set key 112 is made on. "1" of the 10 place flag represents that input to the 10 place of the display unit 77 is allowed.

Subsequently, it is judged in the step S54 whether the flag C is "1". If the flag C is "1", the program flow goes to the step S55. If the flag C is "0", the program flow returns to the step S51. In the step S55, it is judged whether the 10 place flag is "1". With "1" of the 10 place flag, the display on the 10 place and 1 place on the display unit 77 are made 0 in the step S56.

Subsequently, in the step S57, it is judged which key among the ten keys 80 through 89 is depressed. If 0 is entered, the 10 place of the display unit 77 is made blank in the step S58, while if any one of numbers among 1 through 9 is entered, the number thus entered is displayed on the 10 place of the display unit 77 in the step S59.

In turn, the 10 place flag is reset to "0" in the step S60, setting a 1 place flag to "1", going to the step S65. "1" of the 1 place flag represents that a number of the 1 place can be entered into the 1 place of the display unit 77. If none of the data is entered from the ten keys, the program flow goes to the step S65.

The binding margin set routine is held until any one of the binding margin selection keys 113 and 114 and clear/stop key 91 is depressed in the step S65. If a number of 10 place is entered and the number of 10 place is displayed, judgement in the step S55 is NO and the program flow goes to the step S61 for judging whether the 1 place flag is "1". Since the 1 place flag has been set to 1 in the step S60, judgment in the step S62 is YES and it is judged whether a numeric data is entered from the ten keys. If the numeric data is entered, the numeric data entered is displayed on the 1 place of the display unit 77 in the step S63, in turn the 1 place flag is reset to "0" in the step S64 and the program flow goes to the step S65.

In the step S65, it is judged whether the binding margin selection keys 113 or 114 is set. If one of the keys 113 and 114 is depressed, it is judged in the step S60 whether the content displayed in the display unit 77 is larger than 20. If the content is larger than 20, the number 20 is set in the display unit 77 in the step S67 because in the preferred embodiment, the maximum binding margin is set by 20 mm. The binding margin entered is stored in the RAM in the step S68 and the flag C is reset to "0" in the step S71, thereby finishing the binding margin set routine.

Figure 18:
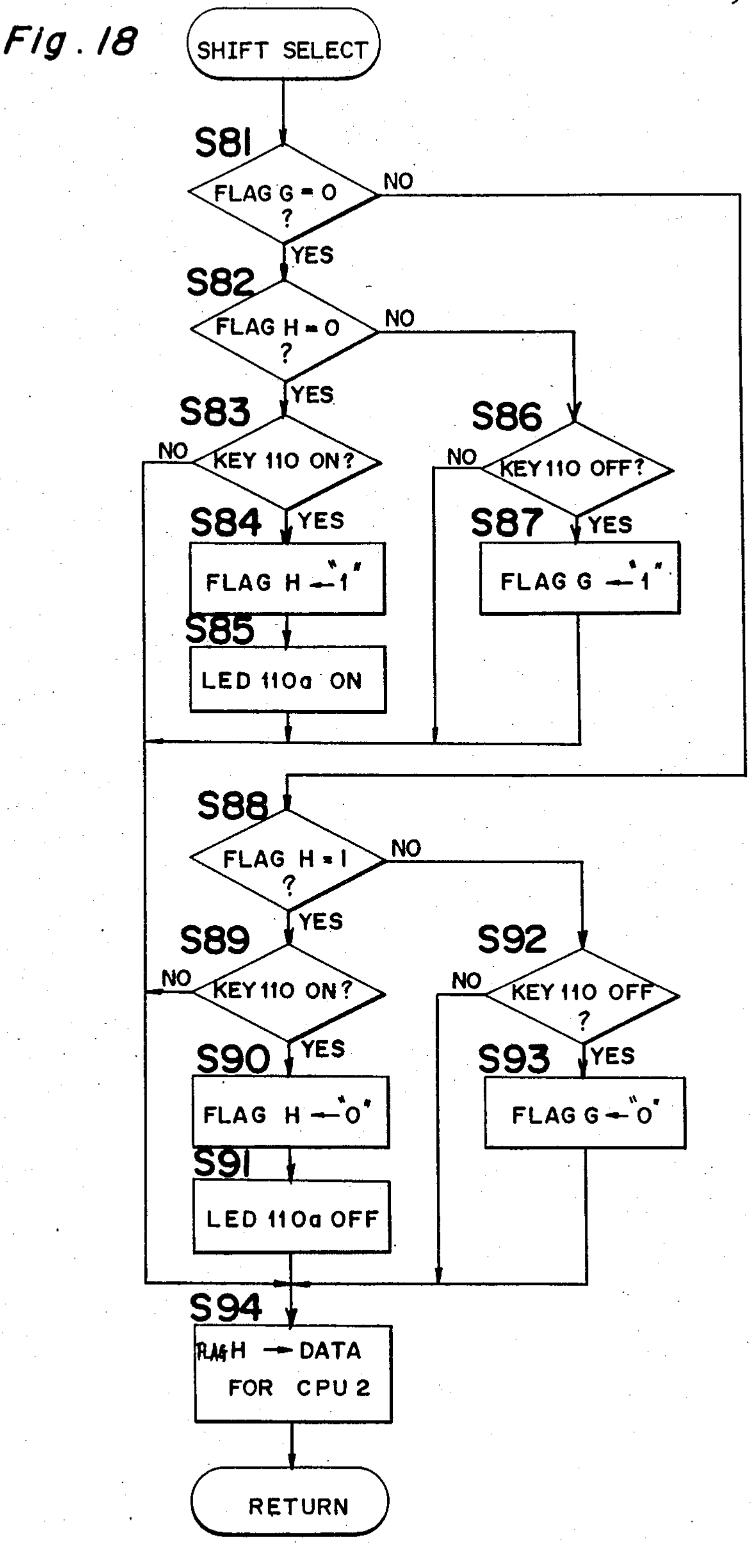
Figure 19:
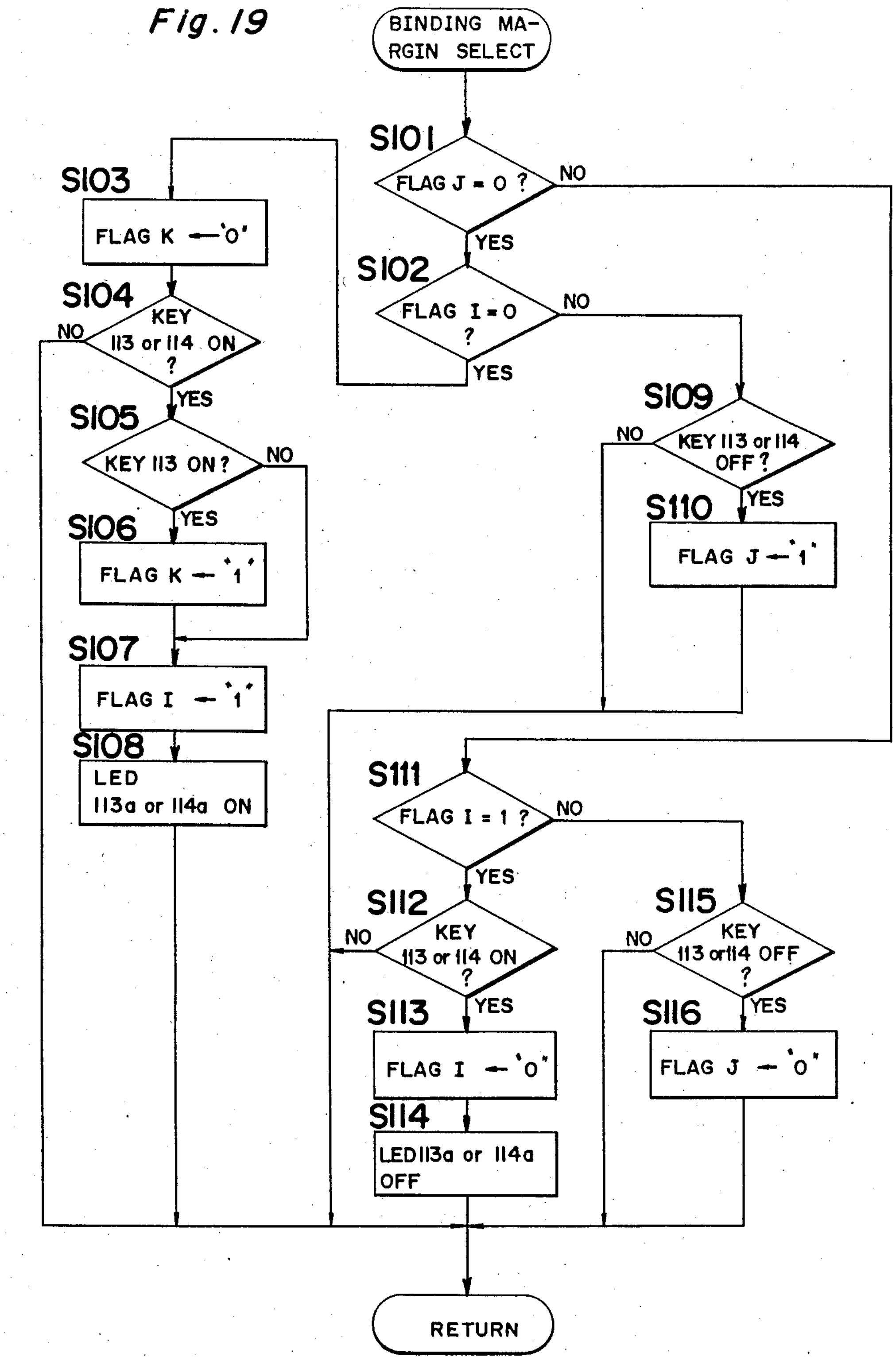

The shift select routine S8 is shown in FIG. 18.

In this routine, operation of the shift selecting key 110 is judged. Flags H and G are used for representing the number of times of on or off of the shift selecting key 110. "1" of the flag H represents on state of the key 110 by the first time operation of the key 110 and "0" of the flag H represents on state of the key 110 by the second time operation of the key 110. "1" of the flag G represents off state of the key 110 by the first time operation of the key 110 and "0" of the flag G represent off state of the key 110 by the second time operation of the key 110. Both of the flags H and G are reset to "0" in the initialization.

In the step S81, it is judged whether the flag G is "0". If the key 110 has not yet been operated, the flags G and H are set "0", so that the judgement in the step S81 is YES. If it is detected in the step S83 that the shift selecting key is made on first time, the flag H is set to "1" in the step S84 and LED 110*a* is turned on in the step S85, and in turn the state of the flag H is transferred to the control unit CPU2 in the step S94. Then the program flow returns to the step S81.

With "0" of the flag G and "1" of the flag H, the program flow goes to the step S86, and if the key 110 is made off the flag G is set to "1" in the step S87. By these operations, the selection of the image shift is completed but the program flow still goes to the step S88 to wait for the release of the image shift routine.

In the step S88, it is judged whether the flag H is "1", with YES in the step S88 due to the previous setting of "1" of the flag H, the program flow goes to the step S89 wherein on or off of the key 110 is judged. If the key 110 is on the second time, the flag H is reset to "0" in the step S90, whereby LED 110*a* is turned on in the step S91 and the state of the flag H is transferred to the control unit CPU2. Thereafter, by detecting the off of position the key 110 the second time in the step S92, the flag G is reset to "0" in the step S93. Thus, the image shift selecting routine is finished.

FIG. 9 shows the binding margin selecting routine S9.

This routine serves to select on which of the leading edge portion or trailing edge portion the binding margin is formed depending on the operation of the binding margin select key 113 and 114.

Flags I, J and K are used for detecting the states of the respective keys 113 and 114.

"1" of the flag I represents an on state of the keys 113 or 114 for the first time operation of the keys 113 or 114 and "0" of the flag I represents an on state of the keys 113 or 114 for the second time operation of the keys 113 or 114. "1" of the flag J represents off state of the keys 113 or 114 for the first time operation of the keys 113 or 114 and "0" of the flag J represents off state of the keys 113 or 114 for the second time operation of the keys 113 or 114. Each of the flags I and J are reset to "0" by the initialization.

"1" of the flag K represents the decision to form the binding margin on the leading edge portion of the copy paper and "0" on the flag K represents the decision to form the binding margin of on the trailing edge portion of the copy paper.

In the step S101, it is judged whether or not the flag J is "0" subsequently it is judged in the step S102 whether or not the flag I is "0". With the "0" of both flags I and J, both judgement are then YES and the flag K is reset to "0" in the step S103 for selecting the binding margin in the leading edge of the copy paper with priority. When the on state of any one of the keys 113 or 114 in a first time operation is detected in the step S104, it is judged in the step S105 whether or not the key 113 is turned on. If the key 113 is on, the flag K is set to "1" for selecting the binding margin in the trailing edge portion of the copy paper. If the key 113 is off, the flag K is kept unchanged and the flag I is set to "1" in the step S107, in turn LED 113*a* or 114*a* is turned on in the step S108 then the program flow returns to the step S101.

With judgement of YES in the step S101, NO in the step S102 and detection of the off state of the keys 113 or 114 at the first time operation in the step S108, the flag J is set to "1" in the step S110, whereby selection of the binding margin is completed. The program flow goes to the step S111 from the step S101 to wait for the release of the binding margin selecting routine.

In the step S111, it is judged whether the flag I is "1". Since the flag I is set to "1" in the step S107, the judgment in the step S107 is YES. If on state of the key 113 or 114 exist in the second time operation, the flag I is reset to "0" in the step S113, causing LED 113*a* or 114*a* to be turned on in the step S114. Thereafter judgement no in the step S111 is made. When off state of any one an of the keys 113 or 114 in the second time operation is detected, the flag J is reset to "0" in the step S116. Thus, the binding margin selecting routine is released.

Figure 20:
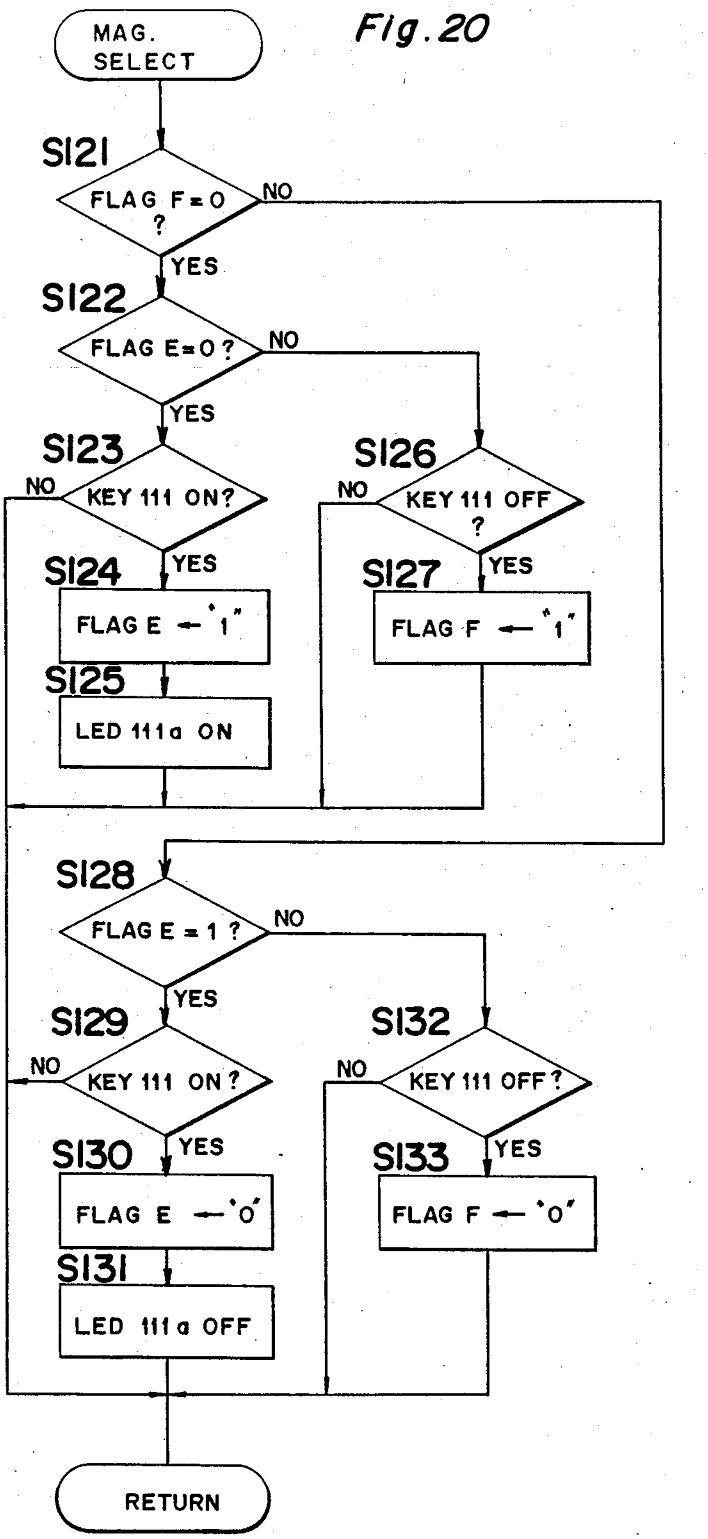

FIG. 20 shows the magnification selecting routine S10.

In this sub routine, the magnification selecting key 111 is operated. During an on state of the key 111 in the first time operation, the magnification selecting is enabled and an on state of the key 111 in the second time operation, the magnification selecting is disabled. Flags E and F are used. "1" of the flag E represents an on state of the key 111 in the first time operation and "0" of the flag E represents an on state of the key 111 in the second time operation. "1" state of the flag F represents an off state of the key 111 in the first time operation and "0" of the flag F represents an off state of the key 111 in the second time operation. Both of the flags E and F are reset in the initialization.

In the step S121, it is judged whether or not the flag F is "0" and in the step S122 it is judged whether or not the flag E is "0". Since both flags E and F are reset to "0", the judgement in the steps S121 and S122 are YES. When an on state of the key 111 in the first time operation is detected in the step S123, the flag E is set to "1" in the step S124, causing LED 111*a* to be turn on in the step S125 and the program flow returns to the step S121.

In the step S121 the judgement YES is made again and in the step S122 judgement NO is made, whereby the program flow goes to the step S126 wherein off state if an of the key 110 in the first time operation is detected, then the flag F is set to "1" in the step S127. By these operation steps the magnification selecting is completed and the program flow goes to the step S128 from the step S121 to wait for the releasing of the magnification selecting routine.

In the step S128, it is judged whether or not the flag E is "1". The judgement is YES since the flag E was already set to "1" in the step S124. When an on state of the key 111 in the second time operation is detected in the step S129, the flag E is reset to "0" in the step S130, causing LED 111*a* to be turned on. After this operation, with the judgement NO in the step S128, the program flow goes to the step S132. When the off state of the key 111 in the second operation is detected in the step S132, the flag F is reset to "0" in the step S133. Then the magnification selecting routine is released.

Figure 21A:
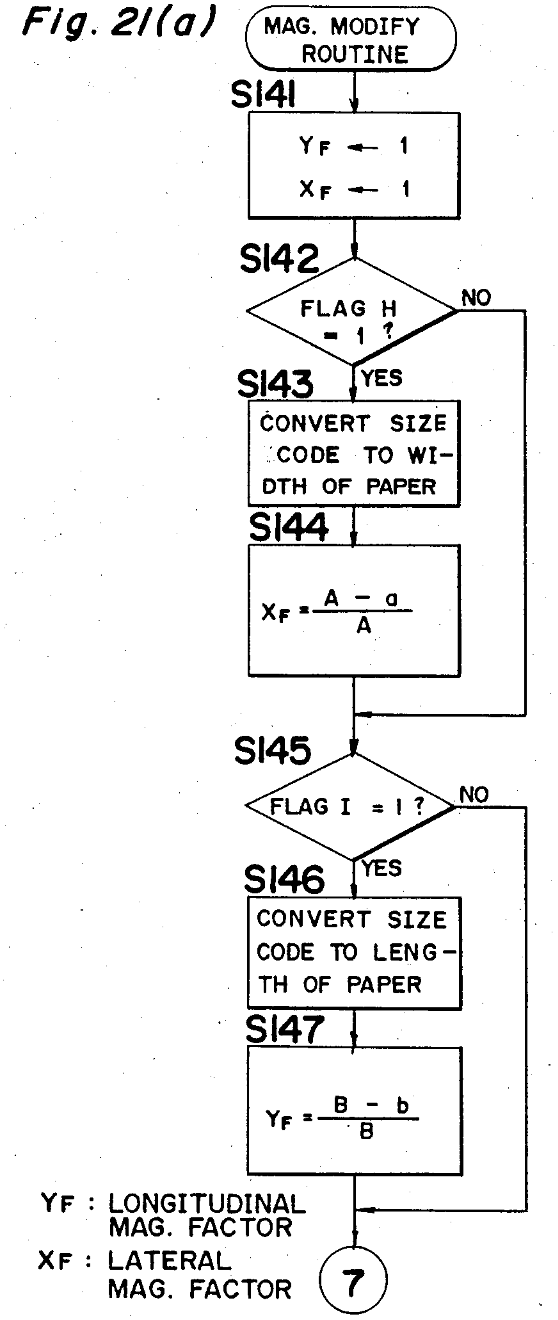
FIG. 21 is comprised of FIGS. 21(*a*) and 21(*b*) and FIG. 22 is comprised of FIGS. 22(*a*) and 22(*b*).
Figure 21B:
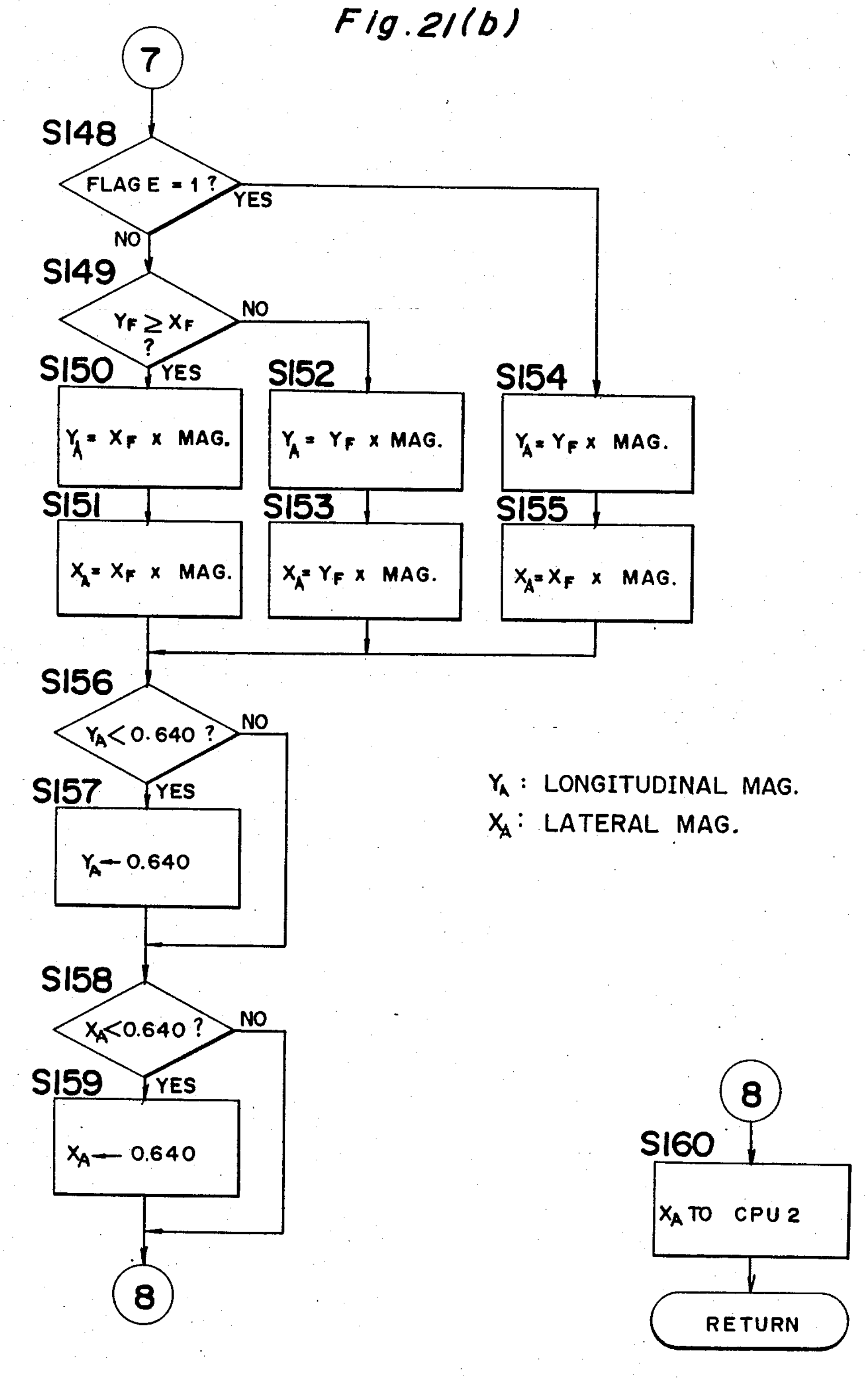

FIG. 21 shows the magnification modifying routine S11.

In the step S141, the longitudinal magnification factor and lateral magnification factor are respectively set to 1, then the program flow goes to the step S142 wherein it is judged whether or not a flag H is "1". "1" of the flag H represents an on state of the shift selecting key 110 in the first time operation, that is to say shifting of the image is selected. With the judgement YES the program flow goes to the step S143 wherein the size code of the copying paper is changed to the width A of the copying paper and in turn the lateral magnification factor (A-a)/A is calculated in the step S144. When the flag H is "0", since this means that the shifting of the image has not yet been selected or the routine S11 is released, the program flow jumps to the steps S144 and S145.

In the step S145, it is judged whether or not the flag I is "1". With "1" of the flag I, which means that it is selected to form the binding margin by the on state of the key 113 or 114, the size code of the copying paper is changed to the longitudinal size B in the step S146 and in turn the longitudinal magnification factor (B-b)/B is calculated in the step S147. With "0" of the flag I, the program flow jumps to the steps S146 and S147 since the binding margin selection routine has not yet been executed or already released.

Subsequently, in the step S148, it is judged whether or not the flag E is set to "1".Since "1" of the flag E represents that the longitudinal magnification is set due to the first time ON of the key 111. Therefore if "1" is detected in the step S148, the longitudinal magnification ratio is calculated in the step S154 by multiplying the copy magnification set by the operation with the longitudinal magnification factor calculated in the step S147. Subsequently, the lateral magnification ratio is calculated in the step S155 by multiplying the lateral magnification set by the operator with the lateral magnification factor obtained in the step S144. To the contrary, if the flag E is "0", since the anamorphic magnification setting is not selected or released, the longitudinal magnification factor and the lateral magnification factor are compared together in the step S149, in a case where the former is greater than or equal to the latter, YES is selected and the program flow goes to the step S150 wherein the magnification ratio set by the operator is multiplied with the lateral magnification factor to obtain the longitudinal magnification ratio and in turn in the step S151, the magnification ratio set by the operator is multplied with the lateral magnification factor for obtaining the lateral magnification ratio. If the longitudinal magnification factor is smaller than the lateral magnification factor, the magnification ratio set by the operator is multiplied with the longitudinal magnification factor to obtain the longitudinal magnification factor in the step S152 and in turn the magnification ratio set by the operator is multiplied with the longitudinal magnification factor to obtain the lateral magnification ratio.

As mentioned above, in this embodiment, in a case where the anamorphic magnification is not set, the magnification ratio can be set by selecting the smaller magnification factor with a priority for modification of the magnification ratio set by the operator.

In the step S156, it is judged whether or not the longitudinal magnification ratio thus obtained is smaller than the lower limit magnification of 0.640. In a case where the set magnification ratio is smaller than 0.64, the longitudinal magnification ratio is set to 0.640. Similarly if the lateral magnification ratio is smaller than 0.640 (step S159), the lateral magnification ratio is set to 0.640. The modified magnification ratios as described above can be transferred to the control unit (CPU2).

Figure 22A:
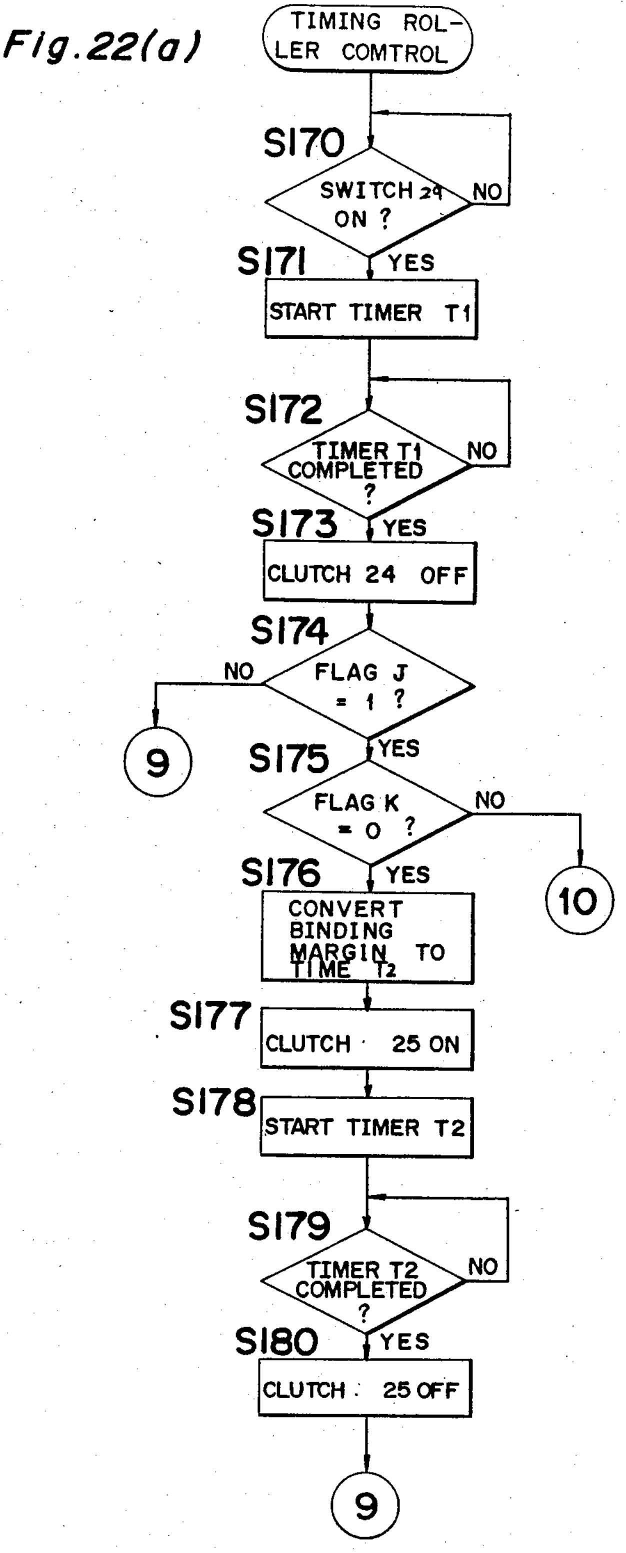
Figure 22B:
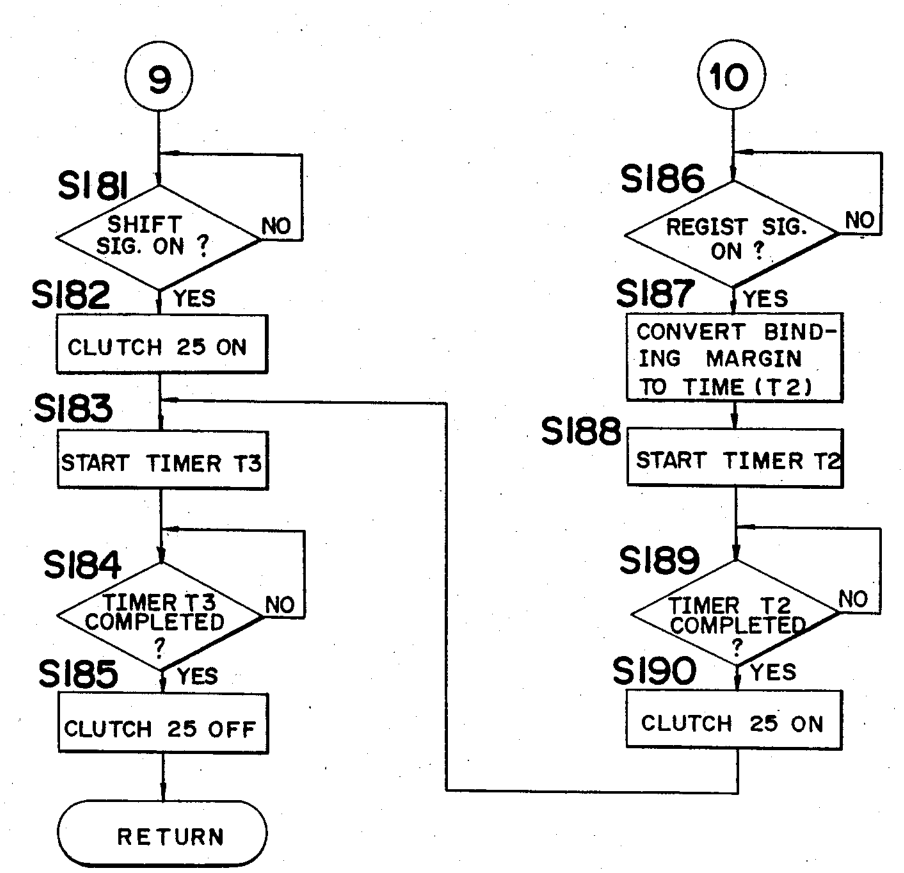

FIG. 22 is a sub routine for controlling the timing rollers 26 for forming the binding margin. This subroutine is executed in the step S13.

For a copying operation, the copy papers are fed and when the clutches CL 24 for the transfer rollers 24 are turned on, the sub routine shown in FIG. 22 is executed. The step S170 is provided for waiting for the ON of the sensing switch 29. If the switch 29 is ON, a timer T1 is started in the step S174. The timer T1 serves to control a period of time during which the transfer rollers 25 rotate so that the leading edge of the copy paper reaches the timing roller 25. Waiting for lapse of the time defined by the timer T1 in the step S172, then the clutch CL24 is made off to cause the copy paper to wait.

Subsequently, it is judged whether or not the flag J is "1". With "1" of the flag J, which represents that the binding margin setting is selected due to the first time ON of the key 113, it is judged whether or not the flag K is "0". "0" of the flag K represents decision to form the binding margin in the leading edge portion of the copy paper. With "0" of the flag K, a timer T2 is set by the time corresponding to the size of the binding margin in the step S176. Then the clutch CL25 is turned ON so as to rotate the timing rollers 25 in the step S177 and the timer T2 is started. The step S179 is provided for waiting for the lapse of the time set in the timer T2 and the clutch CL25 is turned off in the step S180, causing the copy paper to wait. The timer T2 serves to preliminarily forward the copy paper by the length corresponding to the binding margin so that when the timer T2 counts up the predetermined time, the leading edge portion of the copy paper is projected forwardly from the timing rollers 25 by the length of the binding margin.

Subsequently, the step S181 waits for an ON of a regist signal which is used for starting the rotation of the timing rollers 25 so as to coincide the leading edge of the toner image formed on the photosensitive drum 1 and the leading edge of the copy paper. When the regist signal is made ON, the clutch CL25 is made on in the step S182 to rotate the timing rollers 25 with a timer T3 started in the step S183. The timer T3 is provided for driving the rollers 25 so that the trailing edge of the copy paper leaves the timing rollers 25. Waiting for the lapse of the time set by the timer T3 in the step S184, the program flow goes to the step S185 wherein the clutch CL25 is made off, whereby the subroutine is completed. Through the above operation, there is formed the binding margin in the leading edge of the copy paper corresponding to the length which is preliminarily forward in the steps S177 through S180.

In a case where it is designated to form the binding margin in the trailing edge portion of the copy paper, the flag K is set to "1", whereby ON is detected in the step S175 and the program flow goes to the step S186 to provide for a waiting period until the regist signal becomes ON. When the regist signal is made ON, the binding margin is converted to a time length in the step S187, which is set in the timer T2. Then the timer T2 is started in the step S188. The step S189 serves to wait for the lapse of time set in the timer T2, thereafter the clutch CL25 is made ON to drive the timing rollers 25. The timer T2 serves to delay the timing of feeding of the copy paper by the binding margin. After this operation the program flow goes to the step S183, the clutch CL25 is made ON after lapse of the time set in the timer T3, thereby finishing the subroutine for the binding margin forming. In this case there is formed the binding margin in the trailing edge portion of the copy paper corresponding to the timing of the paper transfer delayed by the operation of the steps S188 through S190.

In a case where it is not indicated to form the binding margin, since the flag J is set to "0", the judgement in the step S174 is NO, then the program after the step S181 is executed. In this case the leading edge of the toner image formed on the photosensitive drum 1 coincides with the leading edge of the copy paper at an image transfer device.

What is claimed is:

1. A copying machine wherein a magnification ratio can be changed substantially continuously within a predetermined range, comprising means for setting a longitudinal magnification ratio of a copied image against an original and a lateral magnification ratio of a copied image against the original independently;

first operation means for indicating to effect a copy with the longitudinal magnification ratio different from the lateral magnification ratio;

paper separation means for separating a copied paper from a photosensitive drum, said paper separation means being provided with a separation belt which contacts on the side edge of the photosensitive drum;

image shifting means for shifting an image projected to the photosensitive drum in a direction away from the separation belt;

second operation means for indicating to effect the image shifting operation by the image shifting means;

means for forming a margin on any one of a leading edge portion or trailing edge portion of a copy paper;

third operation means for indicating to effect to form the margin on the copy paper;

means for detecting the size of the copy paper;

first calculating means for calculating a lateral magnification factor (A-a)/A upon operation of the second operation means, wherein A is a lateral size of the copy paper obtained from the detecting means and a is an amount of image shift;

second calculating means for calculating a longitudinal magnification factor (B-b)/B upon operation means of the third operation, wherein B is a longitudinal size of the copy paper obtained from the detecting means and b is an amount of image shift;

means for setting the lateral magnification factor and the longitudinal magnification factor to 1 respectively when the second operation means and the third operation means are not operated; and means for modifying the copy magnification ratios respectively by calculating lateral and longitudinal magnification ratios by using the selected magnification ratio, the longitudinal magnification factor and lateral magnification factor when said first operation means is operated.

2. The copying machine according to claim 1, further comprising means for variably setting said margin.

3. The copying machine according to claim 1, further comprising means for multiplying the set magnification ratio with either the lateral magnification factor and the longitudinal magnification factor when said first operation means is not operated and for selecting a smaller magnification ratio from the modified magnification ratios.

4. A copying machine having a photosensitive drum wherein a magnification ratio of a copy of an original document with indicia having a longitudinal and lateral dimension can be changed within a predetermined range, comprising:

first means for effectuating a copying operation;

means for setting a longitudinal and lateral magnification ratio for a desired copy image relative to original indicia;

paper separation means for separating a copied paper from the photosensitive drum;

image shifting means for shifting an image of the original projected on the photosensitive drum in a direction away from the paper separation means;

second means for efectuating the image shifting operation by the image shifting means;

means for providing a margin on an edge portion of a copy paper;

third means for effectuating the formation of the margin on the copy paper;

means for detecting the size of the copy paper;

first calculating means for calculating a lateral magnification factor (A-a)/A upon operation of the second means, wherein A is a lateral size of the copy paper obtained from the detecting means and a is an amount of image shift;

second calculating means for calculating a longitudinal magnification factor (B-b)/B upon operation of the third means, wherein B is a longitudinal size of the copy paper obtained from the detecting means and b is an amount of image shift, and means for modifying the set copy magnification ratios respectively by the calculated lateral and longitudinal magnification ratios by using the selected magnification ratio, the longitudinal magnification factor and lateral magnification factor when the second and third means are enabled in the copying cycle.

5. The copying machine according to claim 4, further comprising means for variably setting the margin size.

* * * * *